(No Model.) 2 Sheets—Sheet 1.

J. H. BLESSING.
WATER PURIFYING APPARATUS.

No. 352,943. Patented Nov. 23, 1886.

Witnesses:
S. B. Brewer,
W. M. Brown.

Inventor:
James H. Blessing
by William H. Low,
Attorney.

(No Model.) 2 Sheets—Sheet 2.

J. H. BLESSING.
WATER PURIFYING APPARATUS.

No. 352,943. Patented Nov. 23, 1886.

Witnesses:
J. B. Brewer
W. W. Brown

Inventor:
James H. Blessing
by William H. Low,
Attorney.

UNITED STATES PATENT OFFICE.

JAMES H. BLESSING, OF ALBANY, NEW YORK.

WATER-PURIFYING APPARATUS.

SPECIFICATION forming part of Letters Patent No. 352,943, dated November 23, 1886.

Application filed September 4, 1886. Serial No. 212,679. (No model.)

*To all whom it may concern:*

Be it known that I, JAMES H. BLESSING, of the city and county of Albany, in the State of New York, have invented new and useful Improvements in Water-Purifying Apparatus, of which the following is a specification.

My invention relates to improvements in water-filtering apparatus; and the object of my improvements is to provide means for cleansing water of any impurities that are held in a state of suspension therein, to afford facilities for washing the separated impurities from the filtering material without moving the latter from the apparatus, and to prevent any unfiltered water or any impurities from the filtering material from passing into the water-distributing pipes. I attain this object by means of the mechanism illustrated in the accompanying drawings, which are herein referred to, and form part of this specification, and in which—

Figure 1:
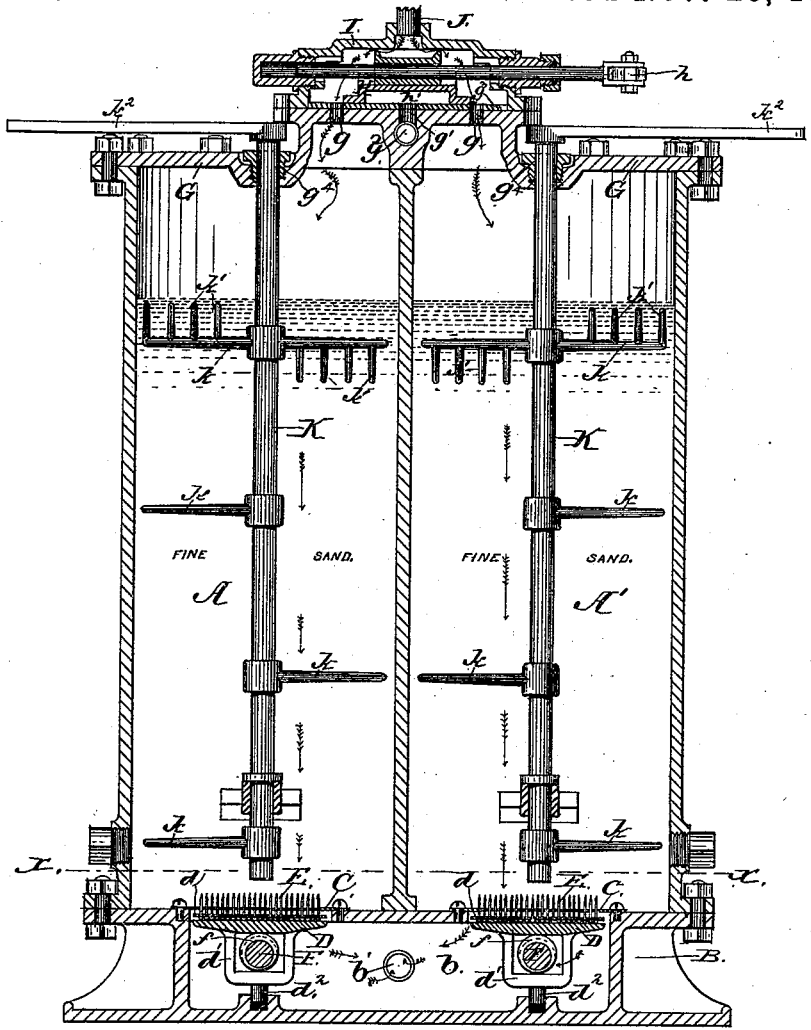
Figure 2:
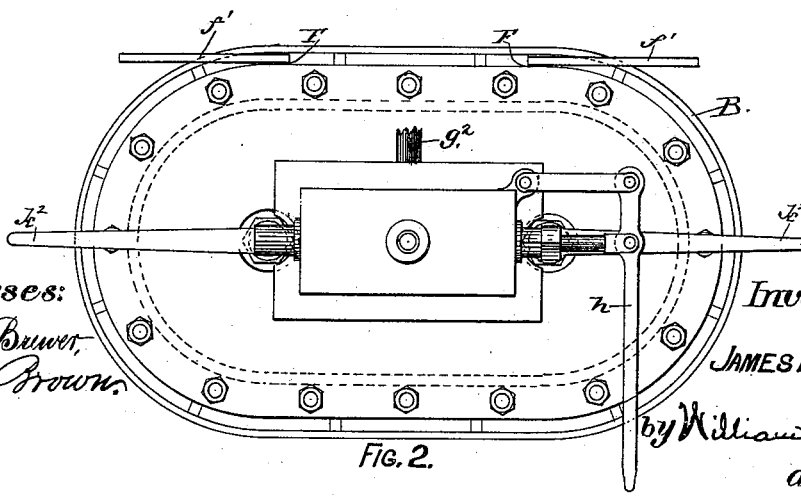
Figure 3:
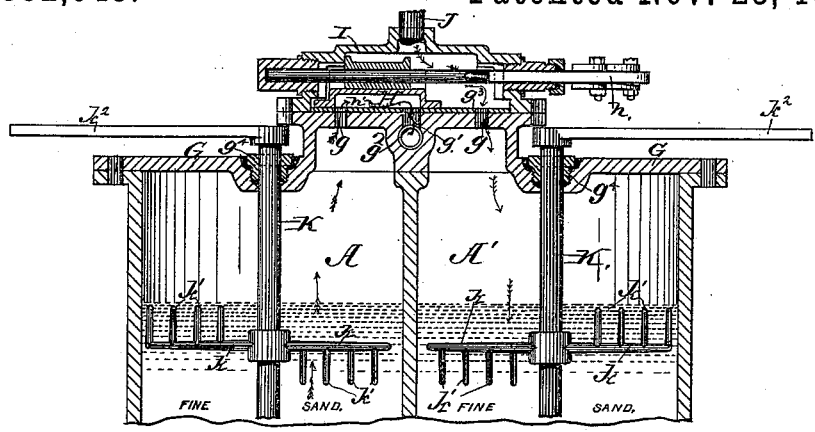
Figure 4:
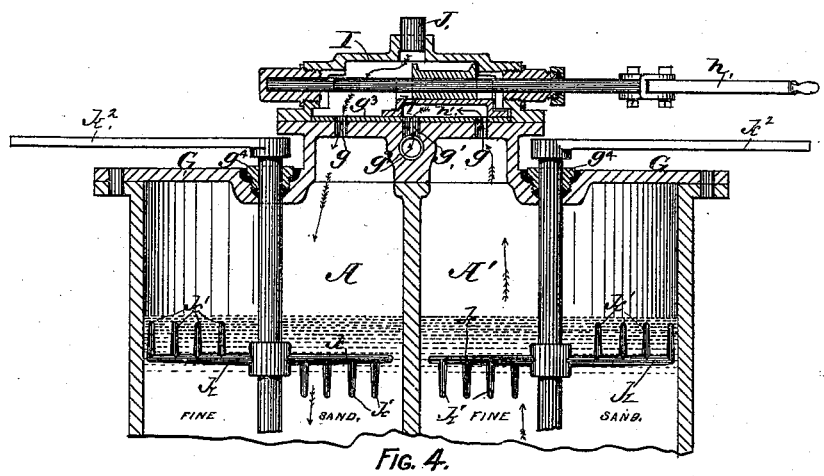
Figure 5:
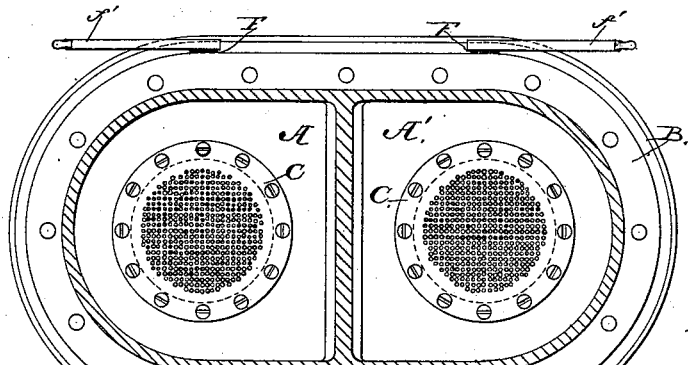

Figure 1 is a longitudinal section of my filter with the valve for controlling the admission of water in its midway position; Fig. 2, a plan view; Fig. 3, a longitudinal section of the upper part of the filter, showing the water-controlling valve at one extremity of its movement; Fig. 4, a like section with said valve at the opposite extremity of its movement, and Fig. 5 a horizontal section at the line X X of Fig. 1.

As represented in the drawings, my filter consists of two separate and independent filtering-chambers, A and A', which may be formed in a single piece, as shown in the drawings; or, when preferred, each chamber may be made in a separate casing. Said chambers are partially filled with a filtering material, for which I preferably use a moderately-fine beach-sand. Said chambers are secured to a bed-piece, B, which contains the water-chamber $b$, into which filtered water from both the filtering-chambers is first delivered, and from which the filtered water is discharged through the outlet-opening $b'$ into the water-distributing pipes.

At the bottom of each of the filtering-chambers a perforated plate, C, is secured to cover openings through the top of the bed-piece B, which lead into the water-chamber $b$, and beneath each of the plates C is a vertically-reciprocating head, D, to which is secured a perforated plate, $d$, the number and location of whose perforations exactly match those of the plate C overlying it. All the perforations in the plates $d$ contain pins or plungers E, whose heads are clamped between the heads D and plates $d$, so as to maintain said pins in erect positions. The upper part of said pins enter the perforations of the plates C, in which they are constantly retained. The diameter of said pins or plungers should be slightly less than the diameter of the perforations in the plates C, the difference in said diameters being just sufficient to permit the water to ooze through the slight annular passages formed thereby, but insufficient to allow the smallest particles of sand to pass therethrough.

Each of the heads D is provided with a stirrup, $d'$, which has a pendent guide-pin, $d^2$, fitted to slide in a guide-hole so as to keep said head in its required position. The reciprocations of the heads D are produced by means of rock-shafts F, having cams $f$, which are fitted to engage in the mortises of the stirrups $d'$. Said rock-shafts project through stuffing-boxes of ordinary construction from the side of the base-piece B, and each is provided with a hand-lever, $f'$, so that an oscillatory motion can be imparted to either one of the shafts without affecting the other. By oscillating either of said rock-shafts the corresponding head D receives a slight up-and-down movement, and the series of pins or plungers E, carried by said head, is reciprocated in the perforations of its corresponding plate C, whereby any foreign matter deposited on said plungers or in the perforations of said plate is quickly and effectually removed, and when these reciprocations are imparted while the filtering material is being washed in the chamber to which that series of plungers is appropriated the loosened particles will be carried by the current of water used for washing upward and out of the filter.

The filtering-chambers A and A' are both covered by a cap-plate, G, which has two induction-ports, $g$, and an eduction-port, $g'$, formed therein. One of said induction-ports leads into the chamber A, and the other into the chamber A'. The eduction-port $g'$ connects with the waste-water pipe $g^2$, through which the waste water used for washing the filtering material is carried off to the drain. A slide-valve, H, is fitted to move on the valve-seat $g^3$ of the cap-plate, and said valve is so proportioned that when it is in its central position, as shown in Fig. 1, both of the induction-ports $g$ will be open to permit the incoming water to flow into and down through both of the filtering-chambers, as indicated by arrows in Fig. 1. By moving the valve H by means of the hand-lever $h$ to one extremity of its movement, as shown in Fig. 3, one of the induction-ports will remain open to allow the incoming water to flow into the chamber A', while through the opposite induction-port a communication will be established with the water-way $h'$ in the valve H, the eduction-port $g'$, and the waste-water pipe $g^2$, whereby the water will be forced to pass (as indicated by the arrows in Fig. 3) down through the chamber A' and up through the chamber A, so as to effect a perfect washing of the filtering material in the last-named chamber, so as to carry all impurities that have been deposited therein off through the waste-water pipe $g^2$. By moving the valve H to the opposite extremity of its stroke, as shown in Fig. 4, the direction of the currents of water is reversed, as indicated by arrows in said figure, and the washing of the filtering material in the chamber A' will thereby be effected in the manner above described in regard to the chamber A. The valve H is covered by a valve-chest, I, with which the water-supply pipe J is connected.

To effect a more perfect cleansing of the filtering material, each of the filtering-chambers is provided with an agitator, K, which, as shown in the drawings, consists of a vertical shaft having radial arms $k$, the uppermost ones of which are furnished with vertical teeth $k'$, for the purpose of more perfectly disturbing the upper stratum of the filtering material, where the greatest deposition of impurities occurs. As in the drawings, the agitators K are vibratile, and in order to impart a vibratory motion to them they are provided with hand-levers $k^2$, which are secured to the upper ends of the vertical shafts which project through stuffing-boxes $g^4$ in the cover G.

During the process of filtration the filtering material becomes closely packed, and is so difficult to disturb that the agitators cannot be moved, but by an upward current of water, such as is used in the operation of washing, the particles of filtering material become separated from each other and the mass becomes sufficiently disintegrated to allow the agitators to be moved with perfect ease.

It will readily be seen that, by reason of the two filtering-chambers, while ample provision is made for the washing of the filtering material, no unfiltered water can pass from the apparatus through the outlet-opening $b'$ and thence into the water-distributing pipes.

I claim as my invention—

1. A water-purifying apparatus consisting of two independent filtering-chambers, a single valve-inclosure from which an eduction-port leads to a waste-water discharge and a separate induction-port leads into each filtering-chamber, and a single valve of insufficient length to cover both induction-ports at the same time, the said valve when moved to cover either of said induction-ports forming a passage which connects the covered induction-port with the said eduction-port, as and for the purpose specified.

2. The combination of two independent filtering-chambers fixed on a bed-piece that is common to both of said filtering-chambers and from which the filtered water is drawn, a single valve-inclosure from which an eduction leads to a waste-water discharge, and a separate induction-port leads into each filtering-chamber, a single valve of insufficient length to cover both of said induction-ports at the same time, but which, when moved to cover either induction-port, will form a passage that connects the covered induction-port with the said eduction-port, and agitators for stirring the filtering material in said filtering-chambers, as and for the purpose specified.

JAMES H. BLESSING.

Witnesses:
  WM. H. LOW,
  W. M. BROWN.